United States Patent [19]
Johnson

[11] Patent Number: 5,687,487
[45] Date of Patent: Nov. 18, 1997

[54] FLATNESS TESTER

[75] Inventor: Douglas W. Johnson, Coon Rapids, Minn.

[73] Assignee: Dogwood Restorations, Coon Rapids, Minn.

[21] Appl. No.: 533,077

[22] Filed: Sep. 25, 1995

[51] Int. Cl.$^6$ .............................. G01B 21/30; G01B 21/20
[52] U.S. Cl. .......................... 33/501.02; 33/533; 33/549
[58] Field of Search ........................ 33/501.02, 501.03, 33/836, 533, 549, 551, 552, 553, 554, 555

[56] References Cited

U.S. PATENT DOCUMENTS

| | | | |
|---|---|---|---|
| 2,224,728 | 12/1940 | Gulliksen | 33/501.02 |
| 4,043,044 | 8/1977 | Whitehead et al. | 33/552 |
| 4,206,401 | 6/1980 | Meyer . | |
| 5,048,195 | 9/1991 | Leonov | 33/533 |
| 5,205,046 | 4/1993 | Barnett et al. | 33/533 |

FOREIGN PATENT DOCUMENTS

| | | | |
|---|---|---|---|
| 117109 | 9/1981 | Japan | 33/533 |
| 185114 | 8/1987 | Japan | 33/533 |
| 4112 | 1/1991 | Japan | 33/533 |

OTHER PUBLICATIONS

Western Electric Tech. Digest No. 63 "Electical Surface Flatness Gauge" by Maselli pp. 21,22, Jul. 1981.
Brown & Sharpe, Metrology Equipment Catalog, 1995, p. G-12 showing GT21 B&S 982 Series Electronic Probe.
Sylvac, Accurate length measurement with long travel probes, (three pages) (date unknown).
Sylvac, Sylvac100, The new Functional display unit, (four pages) (date unknown).
Sylvac, Sylvac 100, Instructions For Use, Firmware Version V2.0, Sep. 1991 (52 pages).
Mitutoyo, New Product, Bulletin No. 1252–519, Digital Mini–Checker (two pages) (Date Unknown).
Mitutoyo, Operation Manual No. 50AAA781, Digital Mini-Checker Code No. 519–620A (19 pages) (Date Unknown).
F. Farago and M. Curtis, *Handbook of Dimensional Measurement*, 3rd Edition, 1994, Chapter 5 (pp. 77–121), Chapter 7 (pp.151–173), and Chapter 11 (pp. 271–312 including p. 287 showing surface plate with air gage probe in recessed mount), Industrial Press, (Date Unknown).
Dialog, Computer search printout of Sep. 8, 1995, (Eight pages).

*Primary Examiner*—Christopher W. Fulton

[57] ABSTRACT

A test apparatus for measuring the relative flatness of a side of an object. The test apparatus includes an electronic probe immobilized in a surface plate such that the contact member of the electronic probe is adjacent to the plane of the surface plate. The use of a surface plate directly eliminates the dial indicator and the trio of stands and their problematic features such as translating the flatness of the surface plate. The use of a high resolution probe permits the relative flatness of the surface plate to be taken into account for the first time. For example, to enhance the accuracy of the relatively high resolution of which the electronic probe is capable of measuring, the flattest portions of the testing surface of the surface plate are determined and the bore in which the electronic probe is set is drilled in one of the "most flat" portions. To protect and isolate the probe and its contact member from especially the industrial or manufacturing environment, the size of the opening for the contact member in the testing surface of the surface plate is minimized. To reduce friction between the side of the object and the contact member, a roller is utilized as the contact member. To reduce errors in measurement, the probe is set at a right angle to the plane defined by the testing surface. To provide access to the probe, the surface plate includes a hand sized opening formed in a nontesting surface of the surface plate.

32 Claims, 4 Drawing Sheets

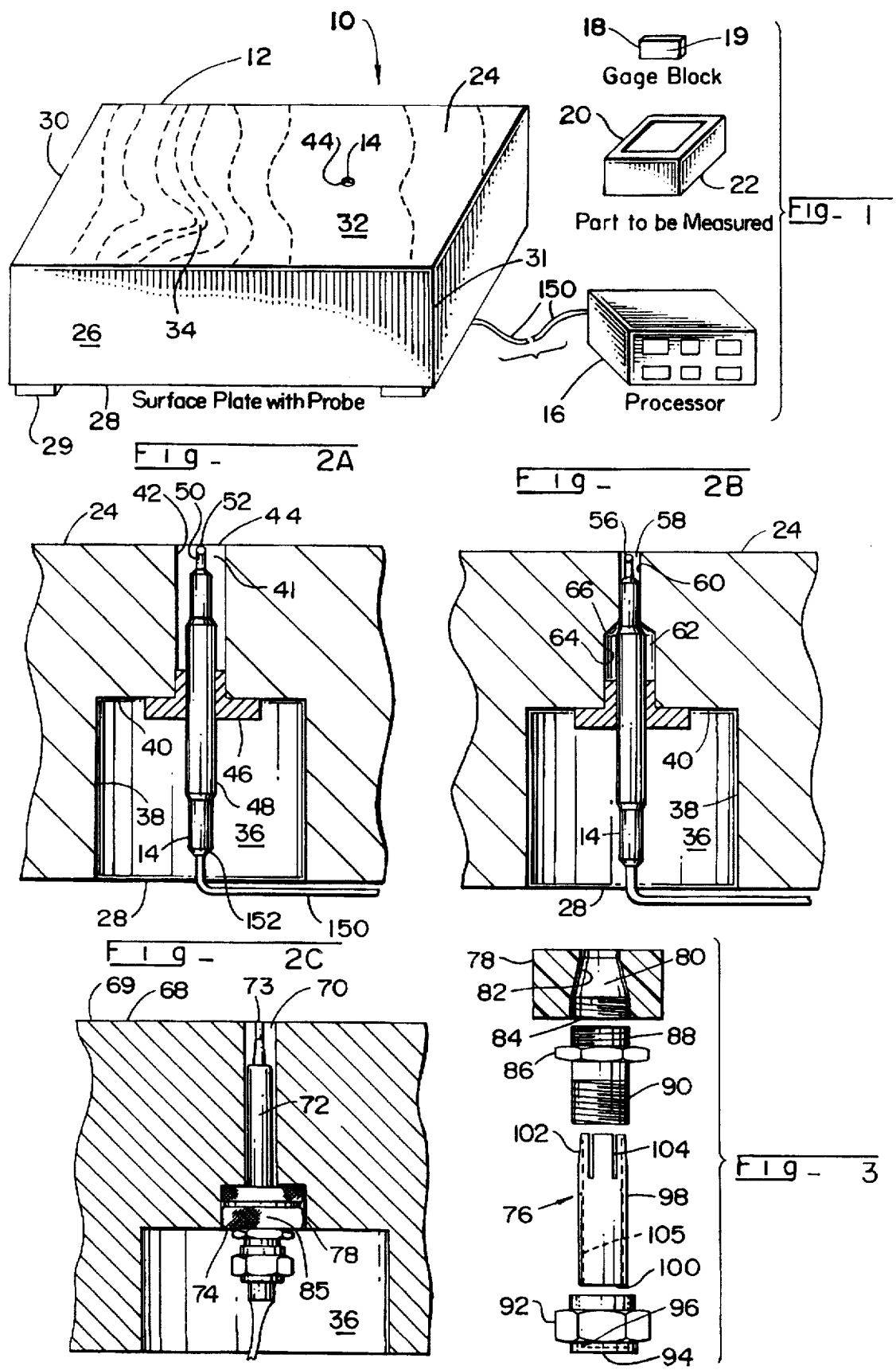

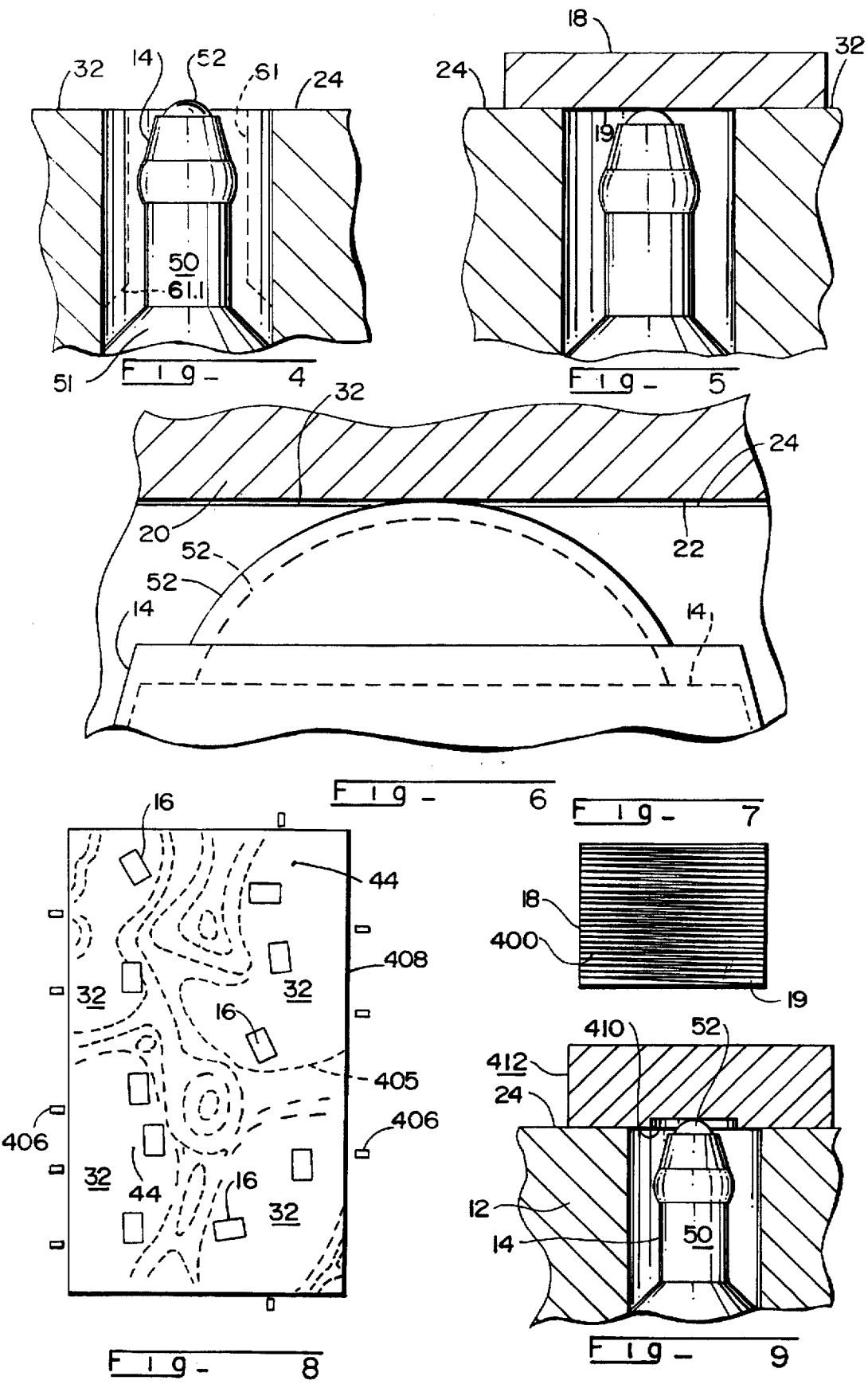

FLATNESS TESTER

BACKGROUND OF THE INVENTION

The present invention relates generally to an electrical apparatus for measuring a side of an object for flatness, particularly to an electrical apparatus for measuring such quickly and at high resolution, and specifically to a surface plate having an electrical probe immobilized therein with the contact member of the probe resiliently projectible slightly beyond the plane of the testing surface of the surface plate.

The ASTM accepted method for determining the flatness of a side of an object includes using a surface plate, three stands, and a dial indicator. The three stands are set upon the surface place and the tips of the stands are measured by a height gage or dial indicator such that the tips of the stands define a plane parallel to the surface of the surface plate. The time required for an accurate and precise set-up may be 30 minutes or more.

After the stands have been set up to define a plane parallel to the surface of the surface plate, the object to be tested is placed on the tips such that the side of the object to be measured for flatness opposes the surface of the surface plate (the side of the object to be tested contacts the tips of the stand). Then the dial indicator is positioned under the object with its contact member contacting the side of the object being tested. Then the dial indicator is slid across the surface of the surface plate to measure different portions of the side of the object being tested. This is referred to as inspection of a part for flatness.

Set-up of the apparatus and inspection of the object for flatness are problematic and prone to error. For example, the bottom surface of the base of the dial indicator must be flat so as to translate the flatness of the surface of the surface plate. The trio of tips must be set in a plane parallel to the surface plate. Further, the dial indicator must be dimensioned for a high degree of rigidity and provide stable support. Still further, the sliding of the dial indicator over different portions of a surface plate translates something other than a known flatness because a surface plate is not perfectly flat. Other problems occur when the stands are jarred or knocked down, or when the parts for inspection, which may be rather heavy or slippery or sharp or irregularly shaped, fall off the stands or are dropped from the hand and hit the probe or even the contact member of the dial indicator so as to damage the dial indicator. Such events usually make it necessary to again go through the setup procedure.

The prior art includes a surface plate with an air gage probe in a recessed mount. For a part resting on the surface plate, the surface plate constitutes a tangent plane, in relation to which the location of individual areas of the part's surface are measured while passing over the extending contact point of the recessed air gage probe. For an illustration of such an instrument, see page 287 of chapter 11 entitled "The Measurement of Straightness, Flatness and Perpendicularity," pp. 271–312, of the book *Handbook of Dimensional Measurement*, by F. Farago and M. Curtis, 3rd. edition, Industrial Press Inc. Such an instrument has a number of drawbacks. For example, the air gage measures to a relatively low resolution. Further, the instrument does not appear to take into account the topography of the surface plate. Also, the instrument would appear to produce a lag time. Nor does it appear that the instrument would produce repeatable results. Such problems may also be present with hydraulically operated probes and mechanical probes.

SUMMARY OF THE INVENTION

A general object of the present invention is to provide unique apparatus and methods for testing the flatness of an object.

Another object of the present invention is to provide an apparatus for testing the flatness of an object which uniquely includes an electrical length measuring probe immobilized in a dense hard flat surface plate. Specifically, the probe is located within the surface plate such that the contact member of the length measuring probe is aligned with or near the testing surface of the surface plate. The contact member is movable on an axis set at a right angle to the surface of the surface plate to positions outside and inside of the surface of the surface plate. The contact member is resiliently biased toward and beyond the outside of the testing surface of the surface plate to continually engage and be urged against the side of the object to be tested, which is slidingly engaged with the testing surface of the surface of the surface plate. Initially, a gage block having a side with a predetermined flatness is placed on the testing surface and on the contact member of the probe to zero set the probe. When placed on the contact member of the probe, the gage block urges the contact member of the probe into the plane defined by the testing surface. This relationship between the contact surface of the gage block and the contact member of the probe provides a value reflecting the distance between the testing surface (or contact member of the probe) and the flat side of the gage block, which theoretically is zero. Subsequently, the side of the object being tested is slid on the testing surface back and forth over the contact member of the probe to collect information on the flatness of such object in relation to the gage block.

Another object of the present invention is to provide such an apparatus for testing the flatness of an object which uniquely fixes the electrical length measuring probe in a safe, temperature-stable environment, i.e., in the surface plate. Preferably, the entire length of the measuring probe is disposed within the surface plate to isolate the probe from wear and tear, such as from testing objects being dropped on the surface plate. The surface plate is preferably formed of stone to provide a temperature-stable environment for the electronic probe, which, despite manufacturers' assertions, is somewhat temperature-sensitive. Further, the body of the probe is rigidly fixed in the surface plate to provide for an easy preset procedure and reproducible test results. The surface plate also includes a hand sized opening for gaining access to the probe for readily attending to the probe and a clamp arrangement for quickly and accurately fixing the probe in the surface plate and for quickly removing the probe therefrom.

Another object of the present invention is to provide such an apparatus for testing the flatness of an object which uniquely includes the probe set at a right angle relative to the testing surface such that the contact member of the probe moves at such a right angle between a position inwardly of the testing surface to a position outwardly of the testing surface. Such a right angle minimizes errors such as cosign errors. The probe is set at this right angle by a unique arrangement for accurately fixing the body of the probe relative to the surface plate.

Another object of the present invention is to provide such an apparatus for testing the flatness of an object which uniquely includes a probe having a roller included as its contact member for rolling engagement with the test object. Friction is thereby minimized between the roller and the side of the object slidingly engaging the roller.

Another object of the present invention is to provide such an apparatus for testing the flatness of an object which uniquely includes spacing the bore for the probe from the periphery of the surface plate so as to provide a flat area for 360 degrees around the head of the probe for a stable sliding area for the object to be tested. Further, this stable sliding area is preferably disposed as close to the head of the probe as possible to minimize edges of the test object catching the edge forming the bore and to minimize edges of the test object catching the side of the head of the probe. Such a feature is uniquely provided by including at least one tapering portion in the bore of the surface plate between where the probe is fixed relative to the surface plate and the opening for the contact member of the probe.

Another object of the present invention is to provide for a unique placement of the probe relative to the testing surface of the surface plate. The testing surface of a surface plate is not a perfect plane. Instead, the testing surface has peaks and valleys. This topography may be measured by an autocollimator. Surface plate topographical maps are produced by manufacturers of surface plates to show how close the manufacturer has come to making a perfectly flat testing surface. Accordingly, the "most flat" portion of the testing surface of the surface plate may be identified and the bore for the probe may be drilled in such a portion. Repeatability of test results is thereby improved. In contrast, the conventional indicator stand is typically slid to different, and thus higher and lower, portions of the surface plate; such a process may taint repeatability results.

Another object of the present invention is to measure the testing surface of the surface plate to a first degree of accuracy (or first sensitivity), to measure the peaks and valleys in the surface plate to a second degree of accuracy (or second sensitivity) greater than the first degree of accuracy (or first sensitivity), and to then utilize a probe preferably having a third degree of accuracy (or third sensitivity) greater than the first degree of accuracy (or first sensitivity) and, more preferably, a probe having a third degree of accuracy (or third sensitivity) equal to or greater than the second degree of accuracy (or second sensitivity).

Another object of the present invention is to provide such an apparatus for testing the flatness of an object which uniquely includes a relatively large surface plate. Specifically, one surface plate may have a plurality of length measuring probes set in the plate about the periphery of the plate and about an arm's length apart from adjacent probes such that, for example, eight objects may be tested simultaneously by eight personnel.

Another object of the present invention is to provide such an apparatus for testing the flatness of an object which uniquely includes a processor communicating with the length measuring probe. The processor stores the preset or zero shift value and compares this standard with continuous profile information collected as the object being tested slides over the head of the probe. The processor then displays such information to permit the operator to assess the relative flatness of the object being tested.

The advantages of the present invention are numerous. For example, the apparatus measures flatness to extremely fine resolutions. Accordingly, the apparatus may be used both in the laboratory, which may require such relatively fine resolutions, and in the manufacturing plant, which may or may not require such sensitivity. The features contributing to this advantage include, for example, using an electrical probe, fixing the probe at a right angle to the testing surface, and placing the probe at the flattest portion of the surface plate.

Another advantage is that an object may be tested quickly for flatness. The present flatness tester is quickly preset, and the object to be tested is quickly run over the contact member of the probe. The test object, not the probe or indicator stand, is hand moved over the predetermined flat surface of the surface plate. Further, results are displayed instantaneously by the control unit to enable a quick sliding, assessment and sorting of test objects. Features contributing to this advantage include, among others, the use of an electrical probe, a roller as the contact member of the probe, and hiding and immobilizing the probe in the surface plate.

Other advantages include accuracy, precision and repeatability. Features contributing to these advantages include, for instance, using an electrical probe, immobilizing and hiding the probe within the surface plate, placing the probe at the flattest portion of the surface plate, and fixing the probe at a right angle to the testing surface of the surface plate.

Another advantage of the flatness tester is its practicality in the industrial environment. The present invention permits the placement of a highly sensitive apparatus in the hands of a relatively unskilled worker who may quickly test the flatness of objects. The invention minimizes the requisite attention as to how the trunk, arms, or legs of the operator hit or bump the surface plate. The invention minimizes the requisite attention as to how careful the test object is placed on the surface plate. The friction minimizing contact member of the invention permits the object being tested to be slid rapidly back and forth across the surface plate to quickly test the object.

Another advantage is that the invention includes, for practical purposes, only one moving part: the contact member. Hence, the operator need only be concerned with sliding the test object over the surface plate. The movement of the dial indicator is eliminated (and translation of the flatness of the surface plate is thereby also eliminated).

Another advantage is that topography of the testing surface of the surface plate is taken into account by placing a highly sensitive electrical probe at the flattest portion of the surface plate. An electrical gage is at least an order of magnitude more sensitive than the mechanical gage or the air gage. Heretofore, only the effective surface, and not the actual surface of the plate in all its minute details, was the meaningful characteristic. With the present invention, the actual surface of the surface plate and all of its minute details is preferably taken into account when deciding where to locate the contact member of the probe relative to the actual surface of the surface plate.

Another advantage is that setup time is minimized. The trio of stands and its dial indicator are eliminated. Further, the electrical probe and its digital or analog processor permits the use of the almost instantaneous zero shift function which is accurate and repeatable. In contrast, mechanical gages and air gages have slow preset or zero shift procedures which are also less accurate, less precise, and produce results which may not be repeatable.

Another advantage is that a result is displayed instantaneously to permit quick assessment and sorting of test objects. Air gages may have lag times of a second or more.

Another advantage is that an object tested for flatness by the present invention remains unscratched. This is provided for by two features. First, the probe applies a relatively light gaging force to the side of the object. Second, the contact member is in rolling engagement with the side of the object.

Another advantage is that precise results are obtained with the present invention. Besides producing accurate results, the invention produces precise values of flatness measurements which are repeatable. The elimination of the three stands on which the object to be tested is placed and the elimination of the sliding of the dial indicator over a portion of a surface plate whose topography may be unknown or unaccounted for reduce the chances for error and dramatically increases the chances for repeatability and precision.

Another advantage is that flatness is measured to such a high degree that the chances for the "chinging" phenomenon are increased. "Chinging" may be described as a bonding— without an adhesive or weld—between the sides of two solid objects on the molecular level. Over time, molecules from each side slowly migrate into or interact with the other side so that a physical bond between the two occurs. "Chinging" is often desired by the manufacturer to keep particles such as dust out of the parts being joined. The chances for "chinging" are maximized when the flatness of the sides of the objects is maximized.

Another advantage is that the surface plate provides a temperature-stable environment for the electronic probe, which is somewhat temperature-sensitive. The surface plate, preferably formed of stone, provides in effect a heat reservoir for heat transfer via the collet arrangement to the probe. Hence the probe is less susceptible to fluctuations in the temperature of the atmosphere and any heat produced by the electronic probe may be passed to the surface plate. This temperature-stable environment is further enhanced by placing the hand-sized access opposite of the testing surface such that the hand-sized access is normally covered by a workbench upon which the surface plate is supported. The temperature-stable environment is still further enhanced by minimizing the size of the opening in the testing surface for the contact member of the probe. Such restrictions to air circulation permit the probe to be maintained at about the temperature of the surface plate, the temperature of which fluctuates less than the air in the manufacturing plant.

Another advantage is that the present flatness tester is inexpensive and simple to produce, use, maintain, and repair.

Another advantage is that the above advantages are realized at the same time and with the same test object. In particular, the advantages of extremely sensitive, accurate and precise measurements quickly are not compromised but are realized with the same apparatus and the same method.

These and further objects and advantages of the present invention will become clearer in light of the following detailed description of the illustrative embodiments of this invention described in connection with the drawings.

BRIEF DESCRIPTION OF THE DRAWINGS

The illustrative embodiments may be best described by reference to the accompanying drawings where:

FIG. 1 shows a perspective view of the present flatness tester and associated apparatus, including a processor, gage block, and part to be measured.

FIG. 2A shows a partially section view of one embodiment of the flatness tester.

FIG. 2B shows a partially section view of another embodiment of the flatness tester.

FIG. 2C shows a partially section view of still another embodiment of the flatness tester.

FIG. 3 shows an exploded view of a collet arrangement for immobilizing the probe of the flatness tester in the surface plate.

FIG. 4 shows a partially section view of the contact member of the probe resiliently biased beyond the plane of the testing surface of the surface plate.

FIG. 5 shows a partially section view of the gage block of FIG. 1 lying flat on the testing surface of the surface plate to preset or zero shift the probe.

FIG. 6 shows a partially section view of the part to be measured for flatness lying flat on the testing surface of the surface plate.

FIG. 7 shows a plan view of one flat side of a part to be measured for flatness, indicating how the part to be measured may be slid in a zigzag fashion back and forth across the contact member of the probe.

FIG. 8 shows a diagrammatic view of a relatively large surface plate with a plurality of probes embedded and immobilized therein in the flattest portions of the surface plate.

FIG. 9 shows a section view of a portion of a surface plate and a part and illustrates how a groove in the part may be measured for depth.

Figure 10:
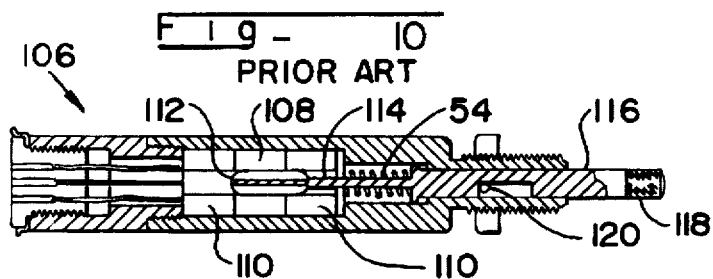
FIG. 10 shows a section view of a prior art electronic probe having a linear variable differential transformer.

All Figures are drawn for ease of expiation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various Figures of the drawings, the same numerals designate the same or similar parts. Furthermore, when the terms "inner," "outer," "radial," and "axial" and similar terms are used herein, it should be understood that these terms have reference only to the structure shown in the drawings as it would appear to a person viewing the drawings and are utilized only to facilitate describing the preferred embodiments.

DESCRIPTION

As shown in FIG. 1, the present apparatus for testing the flatness of an object is generally designated as reference numeral 10. The testing apparatus 10 includes a surface plate 12 with a probe 14 immobilized therein, a control unit or processor 16, and a gage block or master 18 with a side 19 of a predetermined flatness. A part 20 shown in FIG. 1 is a deck cover with at least one side 22, a bottom side, to be measured for flatness. In general, the gage block 18 is used to preset or zero shift the probe 14, after which the side 22 of the part 20 is slid over the surface plate 12 and probe 14 for an indication from the processor 16 on the flatness of the side 22 of the part 20 relative to the gage block 18.

The surface plate 12 is typically a generally solid block with an upper smooth testing surface 24 which ideally represents a plane or truly datum surface, four sides 26, and a lower surface 28 opposite of and generally parallel to the testing surface 24. Three or more resilient, rubber or rubber like feet 29 may be fixed to the lower surface 28 for spacing and isolating the plate 12 from a surface and incidental vibrations or shocks emanating from such a surface. The surface plate 12 further includes a peripheral edge 30 which may chamfered or rounded to minimize nicks or cuts therein. Vertical edges 31 extending between the upper surface 24 and lower surface 28, as well as the lower peripheral edge about lower surface 28, may also be rounded or chamfered. The surface plate 12 when in a block form is typically from about 3 to about 21 inches in depth, has a testing surface 24 measuring from about 12×18 inches to about 72×144 inches, and may weigh from about 70 lb. to about 20,000 lb. However, the surface plate 12 may be as small as four square inches on its testing surface or as large as required to perform the measuring activity, such as building a frame for a cab for a semi-track or a naval gun mount.

The surface plate 10 is preferably a block having a mass and density sufficient such that a free standing block resists movement by one hand on a metal or wooden or plastic workbench, a hardness sufficient to resist dents or impressions when a hand sized metal object is dropped upon it from a height of less than a meter, and a composition and shape which does not change or deform over a temperature range from at least minus 50 F. to at least 150 F. such that its surface may serve as a datum plane. In other words, the preferred surface plate is one which has the properties of great hardness, superior wear resistance, dimensional stability, no rusting or deterioration under common environmental conditions and freedom from burrs when indented. More preferably, the surface plate 10 is formed of granatic rocks such as granite, granodiorite, tonalite, quartz syenite, quartz monzonite, quartz monzodiorite, and quartz diorite, other rocks such as diabase, and synthetic materials such as ceramics or east iron or granite substitutes. Most preferably, the surface plate is formed of granatic rocks or diabase and still more preferably of a black diabase, or charcoal black or pink or gray granite. It should be noted that granite has a specific gravity of about 2.67, a porosity of about 1%, a compressive strength of about 30,000 to about 50,000 lb./inch$^2$, and a tensile strength of about 500 to about 1000 lb./inch$^2$. The granatic surface plate may contain quartz (20–60% by weight), alkali feldspar (1–99% by weight), plagioclase (1–99% by weight), and optional accessory minerals such as biotite, and Fe—Ti oxides.

As to surface plates or granite surface plates, the most current Federal Specification GGG-P-463 as of September 1995 is hereby incorporated by reference in its entirety. Preferred granite surface plates are those designated in such federal specification as Grade A, Class 1 which have a minimum hardness of 90, and a wear resistance groove depth not exceeding 0.0071 inch at any spot and 0.0035 inch on the average (when tracing a not less than 1-inch long straight path on the plate surface with a Rockwell C penetrator diamond under 3 pounds load by causing it to perform reciprocating movements over a three-hour period to complete 1238 cycle strokes). As to relative flatness or flatness accuracy as spelled out by the most current Federal Specification GGG-P-463b as of September 1995 (hereby incorporated by reference in its entirety), which relates work surface dimensions (in inches) to work surface tolerances (in microinches), Grade A surface plates are preferred, Grade AA surface plates are more preferred, and Grade AAA surface plates are most preferred. For example, for a surface plate having a surface 18 inches by 18 inches or smaller, Grade A surface plates have a flatness within 100 millionths of an inch (for a full indicator reading), Grade AA a flatness within 50 millionths of an inch, and Grade AAA a flatness within 25 millionths of an inch. As to a flatness definition, Federal Specification GGG-P-463c (hereby incorporated by reference in its entirety) suggests that "All points of the work surface shall be contained between two parallel planes, the base plane and the roof plane, separated by a distance no greater than that specified for the respective grades."

As shown in FIG. 1, the probe 14 is located where the surface 24 is relatively flat, specifically at a portion designated by reference numeral 32. At the very least, the probe 14 is located away from a portion 34 with a relatively high concentration of ridges and valleys. The phantom lines on the surface 24 illustrate such ridges and valleys in the same manner as a contour map. The height differences between adjacent phantom or contour lines may be measured to a resolution of 10 microinches. The difference between base and roof planes of the testing surface 24 are measured to a degree of accuracy (or have a tolerance) of preferably within 100 microinches, more preferably within 75 microinches, still more preferably within 50 microinches, and most preferably within 25 microinches. The deviations or height differences within the base and roof planes of each range may be measured to a resolution often microinches. Probes of the present invention, preferably electronic probes, measure to a resolution of preferably at least to ten microinches. A contour map may be developed by inspecting a surface plate for flatness by autocollimation. It should further be noted that the "ridges" are of greater importance than the "valleys" when determining the "most flat" portion of the surface 24, as long as the valleys are not of a greater width than the width of the side of the part 20 to be measured for flatness, as the part 20 then slides on ridges and over the valleys. As to surface plates, as to measuring flatness, and as to autocollimators and developing contour maps from autocollimation, chapter 11 entitled "The Measurement of Straightness, Flatness and Perpendicularity," pp. 271–312, of the book *Handbook of Dimensional Measurement*, by F. Farago and M. Curtis, 3rd. edition, Industrial Press Inc., is hereby incorporated by reference in its entirety.

FIGS. 2A, 2B, and 2C show the probe immobilized within the surface plate 12. The surface plate 12 includes a cylindrical shaped recess or larger diametrical bore 36 formed by a cylindrical sidewall 38 and an apertured disc shaped ceiling 40. The recess 36 opens at the bottom surface 28. The recess 36 is at least the size of a hand or closed fist to permit hand access to the probe 14.

In FIG. 2A, a cylindrically shaped hole or smaller diametrical bore 41 formed by a bore sidewall 42 extends between the testing surface 24 and the recess 36 and is coaxial with the recess 36. The bore 41 forms a preferably circular opening 44 in the testing surface 24 and is in communication with the recess 36 when the probe 14 is removed from the surface plate 12.

A clamp or collet arrangement 46 fixes the probe 14 in the surface plate 12. The clamp arrangement 46 is bonded to the ceiling 40 forming the hand sized access 36 and press fit and bonded to the sidewall 42 forming the bore 41. The clamp arrangement 46 encompasses and clamps a body 48 of the probe 14 such that the body 48 of the probe 14 is immobilized in the surface plate 12. The probe 14 further includes a plunger or slide 50 axially slideable into a receptor portion 51 of the body 48. The plunger 50 includes a bearing or roller or contact member 52 for contact with the side 22 of the part 20 to be measured. The body 48 is clamped in the clamp arrangement 46 such that the plunger 50 travels on an axis set at a right angle to the plane defined by the testing surface 24 when the plunger 50 slides in and out of the body 48 of the probe 14. Accordingly, the body 48 of the probe 14 is generally clamped in the clamp arrangement 46 such that the longitudinal axis of the probe 14 is at a right angle to the testing surface 24.

The body 48 is further clamped in the clamp arrangement 46 such that the bearing or roller or contact member 52 is movable on the axis of the plunger 50 outwardly of the plane defined by the testing surface 24, as shown in FIGS. 4 and 6, and inwardly of the plane defined by the testing surface 24 as shown in phantom in FIG. 6. Further, the bearing or roller or contact member 52 is resiliently biased outwardly of the plane defined by the testing surface by a coil spring 54 (shown in FIG. 10) engaged between a proximal end of the plunger 50 and a portion of the body 48 of the probe 14. The plunger 50 is resiliently biased by the coil spring 54 such that the roller 52 normally projects beyond the plane of the testing surface 24 to positively contact the side 22 of the part 20 to be measured.

Another embodiment of the support plate 12 is shown in FIG. 2B. Specifically, the testing surface 24 includes a circular opening 56 and cylindrical bore 58 formed by a bore sidewall 60 such that the sidewall 60 is in close relationship with the plunger 50. Accordingly, for a plunger 50 of a given diameter, the opening 56 and bore 58 of FIG. 2B is of a smaller diameter than the opening 44 and bore 41 of FIG. 2A. The smaller bore 58 communicates with a larger bore 62, which in turn communicates with the hand-sized recess 36. Bore 62 is formed by a cylindrical sidewall portion 64 and a tapering or frustoconical sidewall portion 66. Sidewall portion 66 is disposed between the clamp arrangement 46 and the testing surface 24 and tapers toward the testing surface 24.

Both the smaller bore 58 and the bore 41 are of a sufficiently small size so as to decrease the chances that an edge of the gage block 18 or part 20 to be measured will catch one of the edges forming bore 58 or bore 41. Of the bores 41 and 58, bore 58 is preferred as such is the smaller bore and hence the chances of such edges catching each other are minimized. It should be noted that, if desired, sidewall 60 may be tapered so as to even further decrease the size of the opening 56 and even timber minimize the catching of such edges; such is shown by sidewall 61 indicated in phantom in FIG. 4. In such case, sidewall 61 forms an opening in the testing surface which has a diameter greater than that of the bearing or contact member 52 and greater than that of the plunger or structure 50 carrying and supporting the contact member 52, but smaller than that of the stationary portion or receptor portion 51 of the body 48 of the probe 14 into which the plunger 50 slides and preferably only slightly greater than member 52 and plunger 50. The thickness or depth provided by sidewall 61 and its frustoconical tapering portion 61.1 is sufficient to maintain the integrity or flatness of the surface plate 12 and its testing surface 24 and is further sufficiently thick so as to minimize the chances of cleavage such as by a falling part 20 to be measured. It should also be noted that sidewall 61 (as well as sidewalls 60 and 42) meets surface portion 32 at exactly a right angle; in other words, there is no chamfer at the right-angled intersection between flat surface portion 32 and sidewall 61 (or sidewalls 60 and 42).

It should further be noted that, if desired, sidewall 60 may engage the probe body 48 to further aid in lateral stability of the probe 14. In such a case, the diameter of the sidewall 60 is the same or substantially the same as the diameter of the outer surface of the respective portion of the probe body 48.

A further embodiment of the support plate and one type of clamp or collet is shown in FIGS. 2C and 3. The support plate 68 with a testing surface 69 includes a cylindrical bore 70 for an electric probe 72 having a head or contact member 73. The bore 70 leads into a second compression cap receiving bore 74 which in turn communicates with the hand sized recess 36. Bore 74 is concentric with bore 70. To mount and immobilize the probe 72 in the support plate 68, a collet arrangement 76, shown in FIG. 3, is used. The collet arrangement 76 includes a brass compression cap 78 which is fixed, such as by being press fit and bonded, in the receiving bore 74. The compression cap 78 includes a concentric opening 80 which is formed in part by a frustoconical sidewall 82 and threads 84. The compression cap 78 includes a knurled surface 85 to facilitate bonding between it and the surface plate 68. The collet arrangement 76 further includes a male nut 86 with a first threaded portion 88 for engaging the threads 84 of the compression cap 78 and with a second threaded portion 90 for engaging a female nut 92. The female nut 92 includes a through opening 94. The opening 94 is formed in part by threads for engaging the second threaded portion 88 of the male nut 78 and is further formed in part by a sidewall having an annular lip 96. The circular lip 96 engages a steel collet 98 of the collet arrangement 76 and more specifically engages collet annular end 100. An opposite end 102 of the collet 98 is slightly tapered and includes axially extending slots 104. The steel collet 98 includes a through hole 105, indicated in phantom, for the probe 14.

To mount the probe 72 in the support plate 68, the compression cap 78 is bonded and press fit into the bore 74. The male nut 86 is then threaded into the compression cap 78. The collet 98 is then inserted into the female nut 92 such that the end 100 engages the annular lip 96, and then collet 98 is inserted through the male nut 90 such that the slotted collet end 102 slightly engages the frustoconical sidewall 82, whereupon the female nut 92 is threaded partially onto the male nut 86. The probe 72 is then inserted into and through the collet arrangement 76 such that the head or contact member 73 is adjacent or slightly below the surface 69 of the surface plate. Then the female nut 92 is turned so as to bring the slotted end 102 to bear against the frustoconical sidewall 82 and consequently against the body of the probe 72. As the female nut 92 is further tightened, the slotted end 102 radially engages the periphery of the body of the probe 72 with greater force and the probe 72 may be axially pushed upward slightly.

It should be noted that the bores 41, 58 and 70 are first formed by drilling operations in their respective surface plates. The bores 41, 58 and 70 extend initially from the testing surface to the opposite surface. To ensure perpendicularity with the testing surface 24 of the surface plate 12, or with portion 32 thereof; a jig bore is used. The hand sized recess 36 is then formed by a drilling operation. Then, in the case of surface plate 68 of FIG. 2C, the opening 41, 62, or 74 for the compression cap 78 is drilled out. A jig bore is also used here so as to ensure perpendicularity of the sidewall of the opening 41, 62, or 74 with the testing surface of the surface plate or a portion thereof Subsequently, the remaining portion of the openings 41, 58 and 62, or 70 and 74 is microfinished to ensure perpendicularity with the testing surface of the respective surface plate or a portion thereof To further ensure perpendicularity with the testing surface of the surface plate or a portion thereof; a precision machined clamp or collet arrangement 46 or 76 is used. Such is precision machined true such that perpendicularity with the testing surface of the surface plate or a portion thereof is within 0.00001 inches. To further ensure perpendicularity, the collet or clamp arrangement 46 or 76 is press fit within its respective opening, i.e. the outside diameter of the arrangement 46 or 76 is equal to or slightly greater than the diameter of its respective opening into which it is press fit. To still further enhance perpendicularity, the bodies of the probes 14, 72, and 106 are concentric with their respective contact members, the inner portion of the lip 96 is closely aligned with and may engage the body of the probe, the nonthreaded end of opening 80 in the compression cap 78 is closely aligned with and may engage the body of the probe, the entire inner diameter of the collet 98 is closely aligned with and may engage the body of the probe, the tapering of the frustoconical portion 82 may be slight so that the slotted end 102 applies pressure to the body of the probe over a substantial longitudinal distance, and the collet 98 is in close relationship with and may engage the inner wall of the male nut 86 forming the through opening for the collet 98.

The length measuring means or apparatus of the present invention, such as probe 14 or 72, is preferably an electrical probe and, more preferably, an electrical probe with an electromechanical transducer of a certain type, preferably a linear variable differential transformer (LVDT). FIG. 10 shows a cross-sectional diagram of a probe 106 having a linear displacement transducer of the LVDT type. The probe 106 includes one primary coil 108 and two secondary coils 110 arranged in line and symmetrically. A small iron core 112, attached to a nonmetallic rod 114, can move axially within the hollow cylinder formed by the coils 108, 110. The rod 114 is integral with a measuring spindle 116 and is precisely guided radially, its axial position being sustained by spring action via coil spring 54. The spring action also produces the gaging force when the end or contact member 118 of the spindle 116 is brought to bear against the surface of the part being measured.

In FIG. 10, the measuring spindle 116 has a plain bearing guide 120 and helical spring 54 for balancing the position of the core 112. However, other types of displacement transducers for the present invention may use a frictionless reed suspension for both these functions.

For operating the transducer or probe 106, an excitation voltage of low potential and high frequency (for example, 6 volts and 2.4 kilohertz) is imparted to the primary coil 108 and when the movable core 112 is in a precisely centered position, the differential transformer induces equal and opposite voltage in the secondary windings 110. When in the gaging process, the measuring spindle 116 is moved, causing a change in position of the integral core 112, the coupling between the primary and the secondary windings 108 and 110 will be altered. This change in the core position produces a difference output voltage that is proportional to the displacement distance of the measuring spindle 116. The phase of this voltage will indicate whether the point being contacted on the part to be measured is under or over the reference position that was originally set to correspond to the electrical null value of the LVDT signals.

Figure 11:
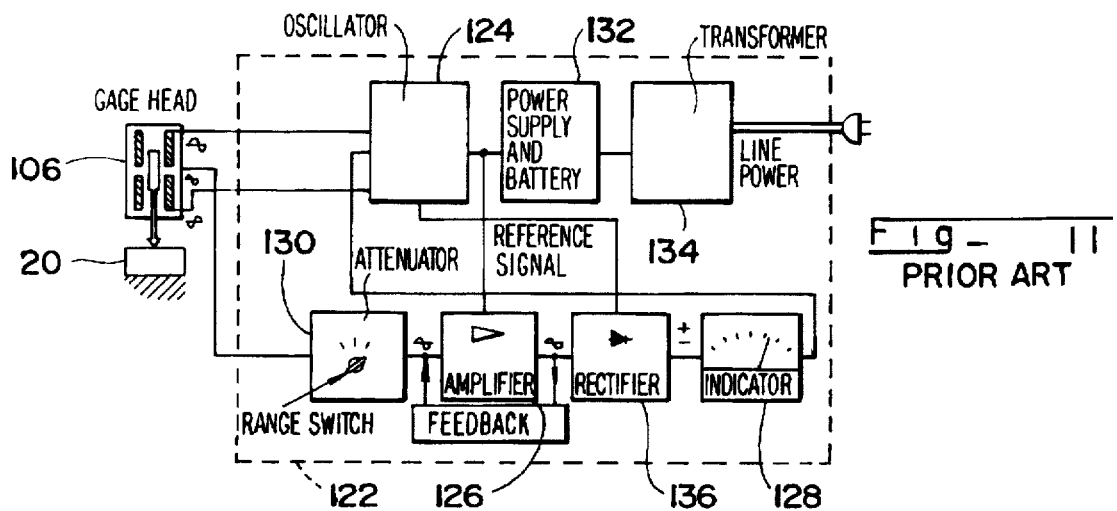
FIG. 11 shows a block diagram of a prior art control unit for an electrical probe.

The electrical measuring means or apparatus further includes a control unit 122 as shown in FIG. 11. The control unit 122 includes an oscillator 124 for producing excitation current for the primary winding 108 of the LVDT to serve instruments that rely on frequencies in excess of 60 Hz, an amplifier 126 for amplification of the relatively weak electrical signals emitted by the transducer 106 in response to the sensed mechanical displacement, means for demodulating the amplified signals to make them available for display on a meter or indicator 128, an attenuator 130 for change of amplification, means for pointer position shift (zeroing), and means for gain adjustment (calibration). The control unit 122 may further include a battery 132, and/or transformer 134 for line power, and rectifier 136.

As to the length measuring means, including the electronic probes 14, 72, and 106, and control units 16 and 132, chapter 5 entitled "Comparative Length Measurements with Mechanical and Electrical Indicators," pp. 77–121, and chapter 7 entitled "Electronic Gages," pp. 151–173, of the book *Handbook of Dimensional Measurement*, by F. Farago and M. Curtis, 3rd. edition, Industrial Press Inc., are hereby incorporated by reference in their entireties.

Figure 12:
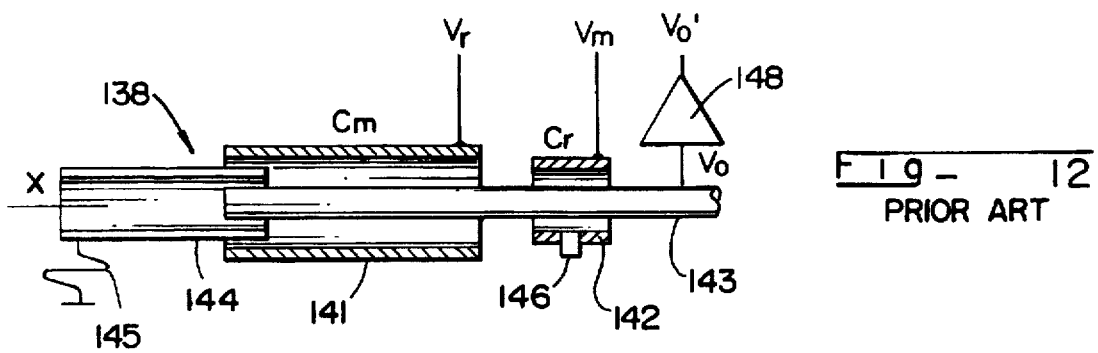
FIG. 12 shows a section view of a prior art electronic probe.

Further as to the length measuring means, including the electronic probes 14, 72, and 106, and control units 16 and 132, U.S. Pat. No. 4,206,401 is hereby incorporated by reference in its entirety. As shown in FIG. 12 of the present invention, corresponding to FIG. 1 of U.S. Pat. No. 4,206,401, an electronic probe 138 includes cylindrical electrodes 141 and 143 which form a measuring capacitor $C_m$ while cylindrical electrodes 142 and 143 form a reference capacitor $C_r$. Whereas, reference capacitor $C_r$ remains constant, the measuring capacitor $C_m$ is linearly modified by the displacement X to be measured. This modification can be obtained in various ways, e.g. by a relative displacement of electrodes 141 and 143 or, as shown in FIG. 12, by inserting a screen 144, corresponding to the displacement X to be measured and which therefore brings about a capacitance change proportional to this displacement. The latter method has two advantages: first, the thus constructed transducer is substantially insensitive to guidance errors of the screen, particularly with a cylindrical construction as in FIG. 12, and, second, the electrical connections to electrodes 141 and 143 are fixed, while screen 144 as the only movable part must be at the noncritical zero potential by means of a contact or movable line 145, whereby the latter may be a restoring spring.

Electrode 141 is excited by a constant a.c. voltage $v_r$, called the reference a.c. voltage, and electrode 142 by a variable a.c. voltage $v_m$, called the measuring a.c. voltage. The measuring a.c. voltage $v_m$ is varied by the electronic means described hereafter in such a way that the a.c. voltage $v_o$ induced on the common electrode 143 becomes zero. In this case, the sum of the capacitive currents flowing from electrode 143 is equal to zero, i.e.: $i_{cm}+i_{cr}=0$, so that in the case of a.c. voltages of the same type and frequency: $v_r x c_m + v_m x c_r 0$ or $v_m = -c_m/c_r x v_r$. Thus, $v_m$ is in a linear relationship to the displacement X because the measuring capacitance $C_m$ is proportional to the displacement X. In addition, changes to the dielectric constant have no influence if $C_m$ and $C_r$ have the same dielectric, e.g. air.

Such an arrangement of the electrodes also permits in simple manner the calibration of the transducer sensitivity by adjusting the reference capacitance $C_r$, e.g. by means of a set screw 146, thus changing the ratio of the voltage change to the length change. This gives the possibility of alternately connecting different transducers to a common electronic processing unit without the need to recalibrate each time. Further, if desired, a simple impedance transformer 148 may be placed in the transducer.

Electronic probe 14, 72, or 106 is preferably a Sylvac model P10L, P10, P25, or P50 probe available from Sylvac SA at Rue du Jara 2, 1023 Crissier/Switzerland or Fowler Tools and Instruments of Boston, Mass. Such probes have a plunger, such as plunger or spindle 116, with a long travel such as 10 mm, 25 mm, or 50 mm, and capacitive transducers, and provide for absolute and comparative measurements. For the present invention, comparative measurements are important, as the zero reference may be set at any point through the measuring range. Accordingly, the head or contact member of the probe 14, 72, or 106 need not be set such that it or its contact surface is exactly in the pie of the testing surface of the surface plate. Such probes timber measure to a resolution as free as 1 μm or 0.1 μm (0.0001" or 0.00001"). Further, linear accuracy is 1 μm (0.00004") over the measuring range of 10 mm (0.4"), 1.5 μm (0.00006") over 25 mm (1"), and 4 μm (0.00016") over 50 mm (2"). It should be noted that the body 48 of the probes 14, 72, and 106 may be stainless and chromium plated steel. Such probes are further shockproof and not affected by magnetic influence. The probes 14, 72, and 106 are waterproof and the interconnecting cable 150 to the control unit 16 is connected to such probe by a connector 152 which is waterproof Such probes are of a plunger gauge construction with a friction beating, such as bearing 52 and have a measuring force from 0.6 to 1.4N, an increase of measuring force from 0.03 to 0.016 N/mm, a permissible lateral force from 0.6 to 0.25N, a repeatability from 0.1 μm to 0.2 μm (0.000004" to 0.000008"), a zero drift from 0.0001 mm/C., an operating temperature range from 0 to 70 C., lifting levers and interchangeable contacts.

Figure 13:
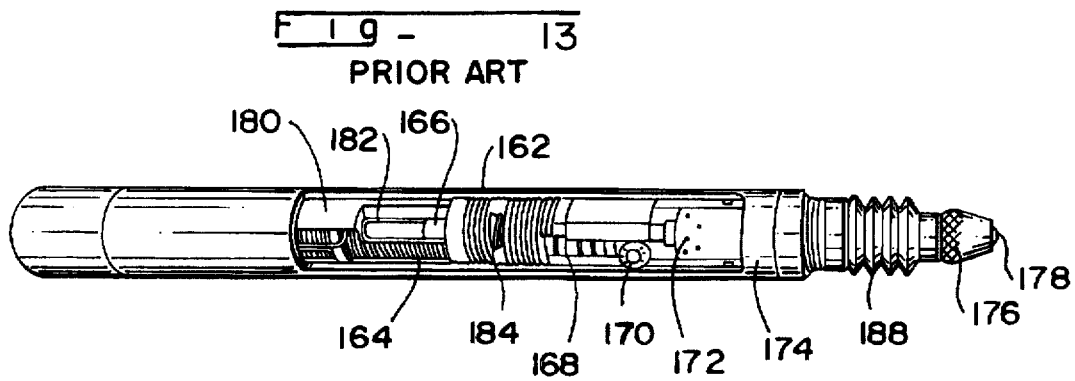
FIG. 13 shows a partially cut away view of a prior art electronic probe.

Probe 14, 72, or 106 may also be a Brown and Sharpe electronic probe of the 982 series, such as the model GT21 probe shown in FIG. 13. Such a probe 160 includes a nickel-plated housing 162 protecting the parts against all external influences, induction coils 164 linked by cable with the electronic instrument or control unit 16, an insulating element 166 maintaining equilibrium of the coefficients of thermal expansion between mechanical and electrical components, an interchangeable compression spring 168 providing controlled measuring force, an anti-rotation guidance mechanism 170, a ball cage 172, an adjustment 174 for limiting the contact travel of an interchangeable measuring head 176 having a bearing 178, a tube 180 taking part in the magnetic circuit, a ferromagnetic core 182, a measuring force spring stop 184, a guide tube 186 assuring high precision axial movement, and a sealing bellows 188 for the plunger.

The control unit or processor 16 preferably includes the features shown in the block diagram of FIG. 11. More preferably, the control unit 16 includes one or more of the features of the Sylvac 100 multifunctional display unit available from Sylvac SA at Chemin du Closalet 16, 1023 Crissier/Switzerland or Fowler Tools and Instruments of Boston, Mass., or one or more of the features of the Mitutoyo Digital Mini-Checker, Series 519, available from Mitutoyo/MTI Corporation of 18 Essex Road, Paramus, N.J.

As to the Sylvac 100 control unit, the totality of the Sylvac 100 "Instructions For Use" manual for Firmware Version V2.0, September, 1991 (52 pages, English version) is hereby incorporated by reference. This manual is available tom Sylvac SA, Ch. du Closalet, CH-1023, Crissier/Switzerland. As to the Mitutoyo control unit, the totality of the Mitutoyo Operation Manual No. 50AAA781 entitled "Digital Mini-Checker, Code No. 519-620A" (18 pages, English version) is hereby incorporated by reference. This manual is available from Mitutoyo/MTI Corporation of 18 Essex Road, Paramus, N.J.

Figure 14:
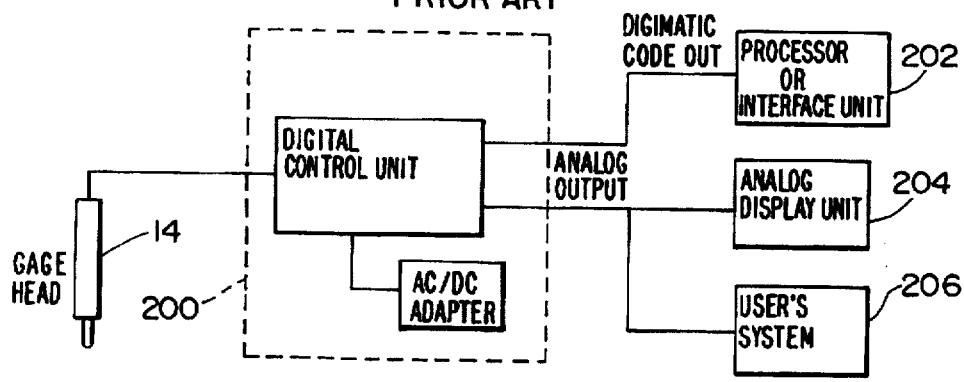
FIG. 14 shows a diagrammatic view of a prior art control unit and system.
Figure 15:
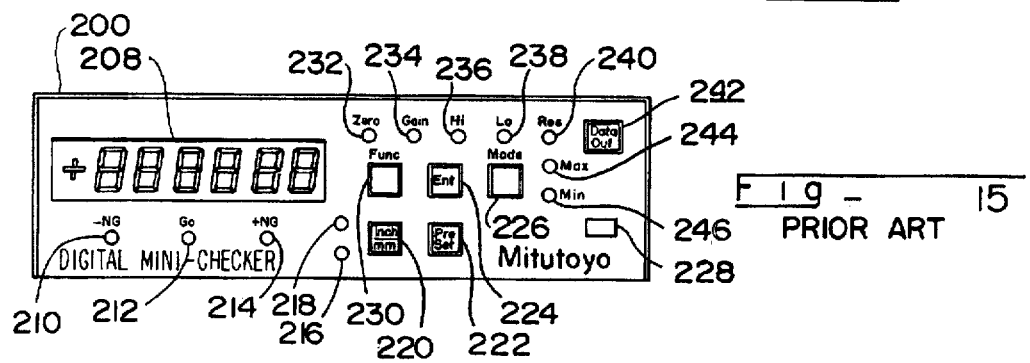
FIG. 15 shows an elevation view of the front face of a prior art control unit of FIG. 14 for indicating functions of the control unit.

The Mitutoyo control unit is shown in FIGS. 14 and 15 and designated by reference numeral 200. The control unit 200 is in electric communication with the gage head or electronic probe 14 and may be in electric communication with a processor or interface unit 202, an analog display unit 204, and a user's system 206. As shown by FIG. 15, the control unit 200 includes: a) a six digit display 208 with a polarity sign, b) means for determining when the measured data goes below the low limit setting value and an LED 210 which turns on for indicating such, c) means for determining when the measured data falls within the low and high limit setting values and an LED 212 for indicating such, d) means for determining when the measured data goes over the high limit setting value and an LED 214 for indicating such, e) means for selecting the metric unit and an LED 216 for indicating when such is selected, f) means for selecting the inch unit and an LED 218 for indicating when such is selected, g) means including a key 220 for toggling between the inch an metric units, h) means including a key 222 for zero setting or presetting the system to the desired value, i) means including an enter key 224 for performing the following: 1) as to the preset function, increments the flashing digit and executes the function; 2) as to the CALZERO (Probe Electrical Zero) function, sets the display to zero; 3) as to the CALGAIN, LIMIT-HI (HIGH) and LIMIT-LO (LOW) functions, initiates the edit mode, increments the flashing digit, and executes the function; 4) as to the RES (Resolution) function, toggles among the resolution, executes the function (only allowable in inch mode), j) means including a mode key 226 for toggling among Maximum Hold, Minimum Hold and normal (no hold) modes, k) means including a power switch 228 for turning the power to the system ON or OFF, l) means including a FUNC (function) key 230 for toggling among Zero and Gain settings of CAL (Calibration) function, HI (High) and LO (Low) settings of LimiT function and RES (Resolution) function, m) means including a ZERO LED 232 for indicating when the zero setting of calibration function is selected (such zero setting is used only in system calibration against the gage head), n) means including a GAIN LED 234 for indicating when the gain setting of calibration function is selected (such gain setting is used only in system calibration against the gage head), o) means including a HI LED 236 for indicating when the high (upper) limit setting is selected, p) means including a LO LED 238 for indicating when the low (lower) limit setting is selected, q) means including an RES (Resolution) LED 240 for indicating when the resolution function is selected (resolutions of 0.000005"/ 0.0001 mm, 0.00001"/0.0001 mm, 0.00002"/0.0002 mm, 0.00005"/0.0005 mm, and 0.0001"/0.001 mm are available), r) means including a DATA OUT key 242 for outputting the displayed data (Digimatic Code) to the data processors and interface systems, s) means including a MAX (Maximum) LED 244 for indicating when the Maximum hold mold is selected, and t) means including a MIN LED 246 for indicating when the Minimum hold mold is selected. Such means include electronic circuitry or software for carrying out the above functions.

Figure 16:
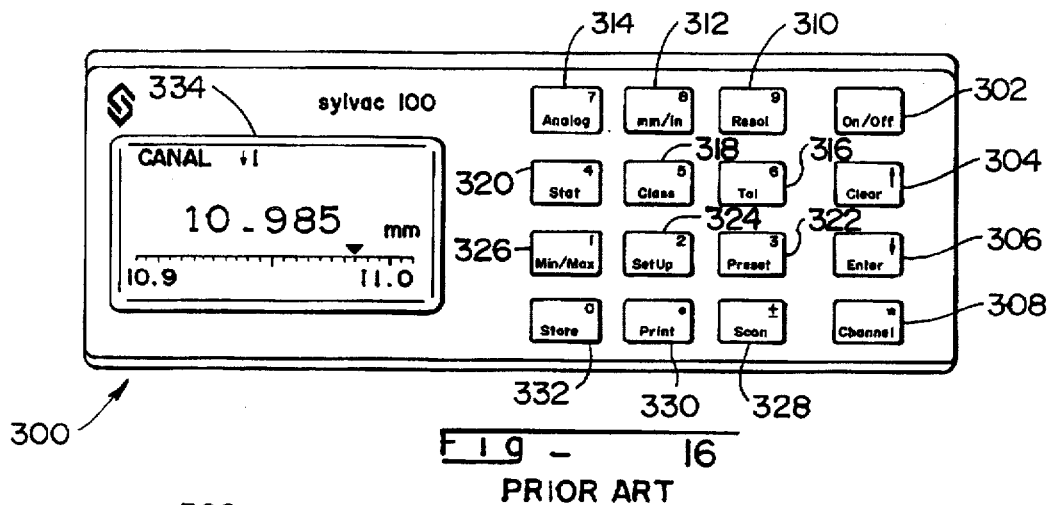
FIG. 16 shows an elevation view of the front face of a prior art control unit for indicating functions of the control unit.
Figure 17:
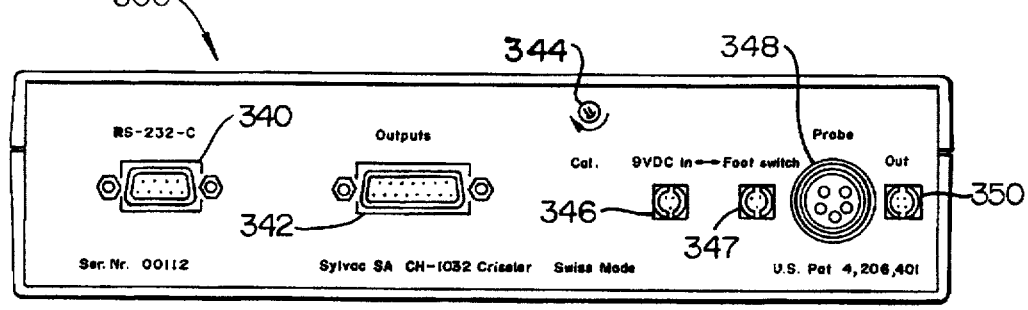
FIG. 17 shows an elevation view of the rear face of the control unit of FIG. 16 for indicating further functions of the control unit.

The Sylvac 100 control unit is indicated in FIGS. 16 and 17 by reference numeral 300. The control unit 300 includes a) means including an On/Off key 302 for turning the control unit off and on, b) means including a clear key 304 for increasing contrast (in the normal measuring mode), clearing the Min/Max memory before taking a new measurement (in the Min/Max mode), canceling an input value or a chosen menu without alteration (in the Set Up input mode), returning directly to the preceding channel (in the Channel input mode), and canceling the Scan mode when measurement values are displayed (when the display values are not displayed the display will be regressed successively until it reaches the first one), c) means including an enter key 306 for reducing contrast (in the normal measuring mode), changing the displayed value (in the Min/Max mode), confirming an input value or canceling a menu without alteration (in the Set Up input mode), progressing directly to the next channel (in the Channel input mode), canceling the Scan mode when the last picture of the measured values is displayed (otherwise the display will successively proceed forwards until it reaches the last picture), and displaying the last picture (in the Stat mode), d) means including a channel key 308 for selecting a channel, selecting the channel which immediately follows, selecting the directly preceding channel, selecting the measuring direction, toggling between the radius and diameter mode, toggling between the sum and difference (A+/−B) measuring mode, and changing the channel to probe attribution, e) means including a resolution key 310 for permitting the choice of a resolution (resolutions of 0.0001 mm, 0.001 mm, 0.01 mm, and 0.1 mm are available), f) means including a mm/inch key 312 for converting between the millimeter or micrometer unit and the inch unit, g) means including an analog key 314 for displaying or not displaying the analog scale, h) means including a tolerance key 316 for displaying or not displaying tolerance indicators including means for determining and indicating when a measuring value is smaller than, equal to, or greater than a nominal size, i) means including a class key 318 for displaying or not displaying a classification of measured value including means for determining and indicating when a measured value is under the 1st class limit, equal to class n (n=1 to 6), or over the last class limit, j) means including a statistical key 320 for carrying out a statistical analysis of measuring stored values (such statistics may include the number of stored values, the maximum stored value, the minimum stored value, the range or the minimum value subtracted from the maximum value, the mean value, sigma, and standard deviation), k) means for inputting a preset value and for determining and displaying the preset value and means including a preset key 322 for displaying the stored preset value, l) means including a set up key 324 for input of parameters for the functions of mm/in, Class, Tolerance, Min/Max, Set Up, Preset, Enter, Store, Print, Scan, and Channel, m) means including a Min/Max key 326 for permitting the choice of displaying minimum, maximum, the difference between maximum and minimum, or mean values, n) means including a scan key 328 initiating the scanning of 1 to n channels (n being defined as after), for comparing each measurement with its assigned tolerance, and for displaying the results with a global indication such as reject, good, or rectify, o) means including a print key 330 for printing of values through the RS-232-C output, according the stored parameters, and p) means including a store key 332 for holding the display or for storing measurements. Such means include electronic circuitry or software for carrying out the above functions. It should be noted that the LCD display 334 is a 8200 point graphic read out.

The rear of the control unit 300 is shown in FIG. 17 and includes a nine pin E-sub female connector 340 (R8-232-C input and output), a 15 pin D-sub female connector 342, a calibration screw 344, a socket 346 for the main adapter/charger, a socket 347 for external contact, e.g. foot pedal, an input socket 348 for a probe or linking cable for a multi channel unit, and a socket 350 for a command cable used with a multi channel unit.

In operation, the bearing 52 of the probe 14 is initially biased so as to project beyond the plane defined by the testing surface 24, as shown in FIG. 4. Then side 19 of gage block 18, which typically has at least two sides which are parallel and of a predetermined flatness (one of which is side 19), is placed on the testing surface 24 to preset or zero shift the probe 14. This preset or zero shift value is then stored by the control unit 16. As the gage block 18 is machined precisely, the side 19 of the gage block 18 and the most flat portion 32 of the testing surface 24 lie in tangent planes to each other.

Subsequently, the part 20 to be measured is placed on the testing surface 24 and over the bearing 52, as shown in FIG. 6. As the bearing 52 is biased outwardly of the plane defined by the testing surface 24, the bearing 52 positively contacts the side 22 to be measured for relative flatness. The control unit 16 then may indicate the displacement (or length or height) from the plane as defined by the side 19 of the gage block 18 (the preset or zero shift value) to the portion of the surface 22 on which the bearing 52 is making contact. If the displacement value is greater than a predefined limit (or less than a lower limit which is a relatively rare occurrence; this lower limit may be a negative value which may indicate a warping of the side 22 outwardly, which may push the bearing 52 inwardly of the plane defined by the testing surface 24 as indicated by the phantom lines in FIG. 6), the part 20 to be measured may be discarded. If the displacement value is within the predefined limits, more information of the part 20, such as a continuous profile, may be gathered by slitting the side 22 over the bearing 52 in the zigzag pattern 400 shown in FIG. 7. Such information may be processed in a number of different ways by the control units 200 and 300. Typically, if any of the displacement values gathered by the patterns 400 or 402 is outside of the upper and lower limits, the part 20 is discarded.

In an manufacturing plant or assembly line operation, a relatively large surface plate 404, such as shown in FIG. 8, may be used. The surface plate 404 includes a set often openings 44 for ten probes 14, which are in electrical communication with one or more control units, such as control units 200 and 300, which in turn may be in electrical communication with one or more of a set often foot pedal switch or key 406, one each for its respective opening 44 and respective probe 14. The openings 44 and their respective bores for the probes 14 are placed in the flattest portions 32 of the large surface plate 404. As stated above, such "most flat" portions 32 may be determined by taking readings of the surface plate with an autocollimator and developing a contour map with such readings.

The surface plate 404 may be of a relatively large size, such as 72 inches by 144 inches, and tom three inches in depth to 21 inches or more in depth. Surface plates may be room-sized or even larger if required for the measurement activity. The openings 404 are placed within an arm's length from the periphery 408 of the surface plate 404 and preferably within a most flat portion 32. It should be noted that work surface tolerance for a surface plate measuring 72 inches by 144 inches is 550 microinches for Grade AAA, 1100 microinches for Grade AA, 2200 microinches for Grade A, and 4400 microinches for Grade B. However, it should be noted that by determining the most flat portions 32, such tolerances are considerably less. Portions 32 within surface plate 404 may be identified which have a flatness accuracy (tolerance) within preferably 100 microinches, more preferably within 75 microinches, still more preferably within 50 microinches, and most preferably within 25 microinches. Phantom lines 405 indicate contour lines.

It should be noted that the foot pedal 406 may be utilized for a number of functions. For example, a tripping of the foot pedal 406 may indicate that the operator has finished with the inspection of one part 20 for flatness and is starting to inspect another part 20. Such contributes to a faster inspection time. Further, if desired, control units such as control units 200 and 300, may be placed at each individual work station. Or, if desired, each probe (up to eight probes for example with control unit 300) may be in electrical communication with one control unit.

It can be appreciated that the degree of accuracy of any measuring system is only as good as the weakest, or least accurate, link. One link of the present invention is the surface plate, or a most flat portion thereof, measured to a flatness tolerance of preferably within 100 microinches, more preferably within 75 microinches, still more preferably within about 50 microinches, and most preferably within about 25 microinches. Elevation differences of the testing surface 24 with respect to the reference plane are usually expressed in terms of 1/100.00 parts of an inch (10 microinches) without decimal points. Another link of the present invention is an electronic probe capable of measuring length displacement at high resolutions, such as to a resolution of 0.00001 inches (10 microinches). The placement in a surface plate of a probe incapable of measuring to such a high resolution defeats the purpose of placing the probe in the surface plate or the purpose of determining the flattest portions of the surface plate in which to drill the bores in which in turn the probes are fixed. For example, mechanical probes, according to Chapter 7 of the *Handbook of Dimensional Measurement* incorporated by reference herein, have a practical limit for the highest degree of sensitivity of about 1/10,000 inches (0.0001 inches, 100 microinches). Air gages conventionally have a sensitivity even less than mechanical gages. Resolution (sensitivity) means the smallest amount of contact member deflection that will produce proportional signals.

The preferred surface plate style is the block style surface plate with upper, lower, and four side surfaces. Other surface plate styles include the two and four ledge surface plates, the angle plate, the vee block, and the angle square.

It should be noted that, although the tester 10 is preferably used as an instrument to measure flatness, it may also be used as an instrument to measure depth. Such is shown in FIG. 9 where the depth of a groove 410 in a part 412 is being measured. To measure the depth of groove 410, the gage block 18 may first be used to preset the probe 14, whereupon the part 412 is laid on the surface 24 and the probe 14 is permitted to rise until the roller 52 makes contact with the floor of the groove 410. A continuous profile of the depth of the groove 410 may be taken by sliding the part 412 on the surface 24 of the surface plate 12.

Among the various types of probes, high resolution probes are preferred. Among high resolution probes, probes which measure to a sufficiently high resolution such that the topography of the surface plate may be taken into account are preferred. Among such high resolution probes may be included laser or optical or light operated probes where the part to be measured includes a reflective surface. Among such high resolution probes, electrical probes are preferred. Among electrical probes, electrical probes with transducers of the LVDT type are most preferred.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A test apparatus for measuring the flatness of a side of an object comprising, in combination:
   a) a surface plate having a solid datum plane testing surface for making contact with the side of the object, with the testing surface having a periphery, with the surface plate having a bore extending at least partially therein from an opening in the testing surface, with the opening being spaced from the periphery; and
   b) an electrical probe in the surface plate for electrically measuring the distance between the plane at the opening and a portion of the side of the object when the side of the object lies flat on the testing surface over the opening such that the flatness of the side of the object may be determined, with the electrical probe comprising a probe body and a contact member for displacement relative to the probe body, with the probe having a transducer for converting input energy of the contact member into output energy of an electrical form, with the probe body immobilized in the bore and with the contact member adjacent the opening, with the contact member being movable between a position inwardly of the plane to a position outwardly of the plane, with the contact member being resiliently biased to project out of the opening and beyond the plane for contacting the side of the object whereby the flatness of the side of the object may be determined.

2. The test apparatus of claim 1 and further comprising, in combination: means on the probe for reducing friction between the probe and the side of the object.

3. The test apparatus of claim 2 wherein the means for reducing friction between the probe and the side of the object comprises a roller for the contact member for rolling engagement with the side of the object being tested.

4. The test apparatus of claim 1 wherein the probe further comprises, in combination: a plunger, with the contact member of the probe mounted on the plunger; and with the body of the probe having a receptor portion into which the plunger slides.

5. The test apparatus of claim 4 wherein each of the opening, plunger, and probe body has a width, with the width of the opening being greater than the width of the plunger such that the contact member and plunger is slideable in a portion of the bore adjacent the opening, and with the width of the opening being smaller than the width of the probe body such that the width of the opening is minimized relative to the width of the contact member and plunger to minimize chances of the object being tested from catching an edge forming the opening.

6. The test apparatus of claim 4 wherein each of the opening, plunger, and receptor portion has a width, with the width of the opening being greater than the width of the plunger such that the contact member and plunger is slideable in a portion of the bore adjacent the opening, and with the width of the opening being smaller than the width of the receptor portion such that the width of the opening is minimized relative to the width of the contact member and plunger to minimize chances of the object being tested from catching an edge forming the opening.

7. The test apparatus of claim 1 and wherein the probe body includes a body portion with a width greater than the width of the contact member and wherein the bore includes a tapering portion disposed between the body portion and the contact member and tapering toward the opening to minimize the width of the opening relative to the width of the contact member and to minimize chances of the object being tested from catching an edge forming the opening.

8. The test apparatus of claim 7 wherein the tapering portion terminates at a distance from the opening to maintain a thickness to an edge of the surface plate forming the opening such that the surface plate retains its integrity.

9. The test apparatus of claim 1 wherein the bore extends from the testing surface to another surface of the surface plate, with such other surface including an access at least the size of a closed fist to permit access by hand into the surface plate and to the probe.

10. The test apparatus of claim 1 and further comprising, in combination: means for accurately fixing the probe in the bore such that a desired angular relationship between the contact member and the plane of the testing surface is maintained; and the surface plate including a sidewall portion forming a portion of the bore, with the fixing means engaging the sidewall portion and probe body and comprising means for applying pressure radially about a periphery of the probe body whereby a tilting of the contact member relative to the plane of the testing surface is minimized.

11. The test apparatus of claim 10 wherein the means for accurately fixing the probe in the bore further comprises, in combination: the sidewall portion being concentric with the opening to maximize the chances of the contact member being maintained at the desired angular relationship relative to the plane of the testing surface.

12. The test apparatus of claim 10 wherein the fixing means includes an outer diametrical portion with a diameter equal to or slightly greater than a portion of the bore such that the fixing means is press fit into the portion of the bore.

13. The test apparatus of claim 10 wherein the fixing means includes a collet arrangement, with the collet arrangement having means for immobilizing the body of the probe laterally and longitudinally relative to the testing surface of the surface plate.

14. The test apparatus of claim 1 and further comprising, in combination: portions of the testing surface being relatively more flat than other portions of the testing surface, and with the bore extending from one of the relatively more flat portions.

15. The test apparatus of claim 1 and the contact member being positioned so as to move on an axis inwardly and outwardly of the plane, with the axis being at generally a right angle to the plane.

16. The test apparatus of claim 1 wherein the bore includes a sidewall which meets the testing surface at a right angle at the opening whereby the distance between the contact surface of the probe and the testing surface is minimized.

17. The test apparatus of claim 1 further comprising, in combination: a control unit in electrical and instantaneous communication with the probe and comprising, in combination:
  a) means for presetting the probe, with the means for presetting the probe including means for storing a first value reflecting the linear distance between the plane and a predetermined flat surface;
  b) means for associating the first value with a second value reflecting the linear distance between the plane and the side of the object being tested, with the means for associating the first value with the second value producing a result of such association; and
  c) means for displaying the result whereby the flatness of the side of the object relative to the predetermined flat surface may be evaluated.

18. The test apparatus of claim 17 and further comprising, in combination: a digital processor means for storing the values and results, with the digital processor means including means for storing a plurality of such values and results as the object to be measured is in contact with the testing surface and in contact with the contact member.

19. The test apparatus of claim 17 wherein the testing surface of the surface plate includes a relatively large surface area, with the surface plate having a plurality of bores therein extending at least partially inwardly from the testing surface, with each of the bores being related to a portion of the periphery to which it is the closest, with each of the bores being spaced within an arm's length from its portion of the periphery, with each bore having a probe located therein such that a plurality of objects may be tested at the same time and on the same surface plate.

20. The test apparatus of claim 19 and further comprising, in combination: portions of the relatively large surface being relatively more flat than other portions of the testing surface, and with each of the bores extending from one of the relatively more flat portions.

21. The test apparatus of claim 1 wherein the surface plate comprises a block.

22. The test apparatus of claim 21 wherein the block comprises generally six sides.

23. The test apparatus of claim 1 wherein the surface plate comprises granatic rock.

24. The test apparatus of claim 1 wherein the surface plate comprises a material selected from the group consisting of granatic rock, granite substitutes, ceramics, and cast iron.

25. The test apparatus of claim 1 wherein the weight of the surface plate is in the range between about 70 pounds and about 20,000 pounds.

26. The test apparatus of claim 1 wherein the surface plate comprises a massive piece, with the surface plate being sufficiently massive such that if free standing such surface plate resists movement by one hand when on a workbench.

27. A method for measuring the flatness of a side of an object on a surface plate with a solid datum plane testing surface, with the surface plate further having a probe mounted therein, with the probe interactable with the side of the object, with the method comprising, in combination, the steps of:
  a) determining which portions of the testing surface are relatively more flat than other portions of the testing surface;
  b) forming a bore in the surface plate such that the bore extends inwardly from one of the relatively more flat portions of the testing surface;
  c) immobilizing the body of the probe in the bore;
  d) presetting the probe with an object having a predefined flat surface and associating a first value therewith;
  e) contacting the side of the object with the testing surface of the surface plate such that the side of the object lies flat on the testing surface of the surface plate over the bore and then permitting the probe to interact with the side of the object to establish a second value; and
  f) associating the second value with the first value to determine the relative flatness of the side of the object.

28. The method of claim 27 wherein the probe comprises an electronic probe, with the probe having a contact member and a transducer for converting input energy of the contact member into output energy of an electrical form, with the contact member contactable with the side of the object.

29. A test apparatus for measuring the distance between a portion of the test apparatus and a portion of an object, comprising, in combination:
  a) a surface plate with a solid datum plane testing surface having a plurality of points, with the points contained between two parallel planes and with the testing surface having deviations between the two parallel planes, with the planes being separated by a distance measured to a first sensitivity, with the deviations being measured to a second sensitivity greater than the first sensitivity, with the testing surface defined by one of the planes, with the testing surface having a periphery, with the surface plate having a bore extending at least partially therein from an opening in the testing surface, with the opening being spaced from the periphery; and b) a probe for measuring the distance between one of the planes at the opening and the portion of the object, the probe being in the bore in the surface plate and interacting with the portion of the object when the object is placed over the opening and flat on the testing surface such that the distance between said plane at the opening and the portion of the object may be measured by the probe, with the probe measuring the distance between said plane and the portion of the object to a third sensitivity, with the third sensitivity being greater than the first sensitivity.

30. The test apparatus of claim 29 wherein the third sensitivity is at least as great as the second sensitivity.

31. A test apparatus for measuring the distance between a portion of the test apparatus and a side of an object, comprising, in combination:

a) a surface plate having a solid datum plane testing surface for making contact with the side of the object, with the testing surface having a periphery, with the surface plate having a bore extending at least partially therein from an opening in the testing surface, with the opening being spaced from the periphery; and b) a probe for measuring the distance between the plane at the opening and a portion of the side of the object, the probe being set in the bore in the surface plate, with the probe interacting with the portion of the side of the object when the side of the object is place flat on the testing surface and over the opening such that the distance between the portion of the side of the object and the solid datum plane testing surface may be determined, and with the probe having a sensitivity at or greater than 10 microinches in measurement of the distance between the portion of the side of the object and the solid datum plane.

32. The test apparatus of claim 31 wherein the probe comprises an electrical probe with a contact member engaging the portion of the side of the object, with the electrical probe further comprising a transducer for converting input energy of the contact member into output energy of an electrical form.

* * * * *